United States Patent [19]

Dziewulski et al.

[11] 4,299,055

[45] Nov. 10, 1981

[54] PLANT CONTAINER

[75] Inventors: Ted Dziewulski, Rosemont; Arthur H. Kay, Schaumburg, both of Ill.

[73] Assignee: Phillips Petroleum Company, Bartlesville, Okla.

[21] Appl. No.: 129,436

[22] Filed: Mar. 11, 1980

[51] Int. Cl.³ ............................................ A01G 9/02
[52] U.S. Cl. ............................................ 47/66; 47/71
[58] Field of Search ............... 47/66, 67, 68, 70, 71, 47/72, 79, 80, 81

[56] References Cited

U.S. PATENT DOCUMENTS

| 754,683 | 3/1904 | Neidl | 47/67 |
|---|---|---|---|
| 1,780,279 | 11/1930 | Smith | 47/79 |
| 1,789,616 | 1/1931 | Bjorklund | 47/79 |
| 3,079,037 | 2/1963 | Schechter | 47/71 X |
| 3,943,661 | 3/1976 | De Vito et al. | 47/67 |
| 3,949,524 | 4/1976 | Mickelson | 47/79 |
| 3,981,099 | 9/1976 | Dziewulski | 47/67 |
| 3,990,179 | 11/1976 | Johnson et al. | 47/67 |
| 4,059,920 | 11/1977 | Worrell | 47/67 |
| 4,092,804 | 6/1978 | Morris et al. | 47/66 |
| 4,170,089 | 10/1979 | Smrt | 47/67 |

FOREIGN PATENT DOCUMENTS

| 201968 | 4/1955 | Australia | 47/71 |
|---|---|---|---|
| 291269 | 10/1965 | Australia | 47/81 |
| 291885 | 10/1965 | Australia | 47/81 |
| 1010657 | 5/1977 | Canada | 47/71 |
| 86168 | 9/1958 | Denmark | 47/71 |

Primary Examiner—James R. Feyrer

[57] ABSTRACT

An improved container for plants or the like comprising a pot and a tray releasably securable to the bottom of the pot. The pot and tray are provided with snap lock means for connecting the pot and tray. The snap lock means includes a plurality of first and second protuberances extending upwardly from the tray with each first protuberance having a horizontal notch in one side thereof and with each second protuberance having a horizontal upwardly opening notch in the top portion thereof. The snap lock means further includes a plurality of pairs of apertures in the bottom of the pot, each pair of apertures being positioned in registration with a corresponding protuberance of the tray and each pair of apertures being separated by a horizontal locking bar sized and shaped to be received in the notches of the corresponding first and second protuberances to releasably secure the tray to the pot.

15 Claims, 8 Drawing Figures

PLANT CONTAINER

The invention relates generally to improvements in container structure. In one aspect, the invention relates to improved plant containers, each of which includes a pot and a tray with means for removably securing the tray to lower portion of the pot.

In the past it has been conventional practice to construct hanging or standing plant containers or flower planters from wood or metal materials with such containers so configured as to hold a plant and surrounding moist soil. Difficulties have been encountered with such conventional plant containers, which difficulties stem largely from the fact that moisture in the soil progresses to the bottom of the planter and does not evenly distribute throughout the soil or soil mixture. Some attempts have been made to avoid such problems by providing holes in the bottom of the pot portion of such a plant container and by incorporating an integrally formed tray with the pot for collecting water which is passed through the soil. Cleaning of such a pot-and-tray plant container is extremely difficult due to the unitary structure. Furthermore, in some instances, water often accumulates in the tray in sufficient quantity to overflow the edges of the tray and cause damage to the supporting surface.

Another problem frequently encountered with fixed or integrally formed pot-and-tray plant containers is that water cannot be drawn from the tray back into the soil in the pot as the soil dries out at the upper levels of the plant container. This problem stems largely from the fact that the hole or holes in the bottom of the pot structure through which the moisture passes from the soil to the tray are generally raised a substantial distance from the water collection tray so that the water cannot be redrawn back into the soil from the tray.

Therefore, a need exists for the provision of a container for plants and the life-supporting environment therefor, which container provides moisture control for the life environment soil, a structure which is easy to clean, and a structure wherein the pot and tray comprising the structure can be securely connected and, alternately, readily separated when desired.

Accordingly, to overcome the deficiencies of the prior art noted above, as well as other deficiencies of the prior art known to those skilled in the field of horticulture, the present invention contemplates a novel plant container comprising a pot, a tray, and snap lock means for releasably securing the tray to the bottom of the pot. The tray is characterized by a generally flat horizontal bottom portion with an outer margin, at least one rib upstanding from the bottom portion and a continuous wall upstanding from the outer margin of the bottom portion. A plurality of first protuberances extend upwardly from the bottom portion of the tray, each first protuberance having a generally horizontally extending notch formed in one side of the first protuberance. A plurality of second protuberances extend upwardly from the bottom portion of the tray, each second protuberance having a generally horizontally extending upwardly opening notch formed in the top portion of the second protuberance. The pot is characterized by a generally flat horizontal bottom portion with an outer margin and a continuous wall upstanding from the outer margin. A plurality of pairs of apertures extend through the bottom portion of the pot, a pair of apertures being positioned in vertical registration with each one of the first and second protuberances of the tray. Each pair of apertures is separated by horizontal locking bar means sized and shaped to be respectively received in the notches of the corresponding first and second protuberances in vertical registration therewith for releasably securing the tray to the pot.

An object of the invention is to provide a plant container which overcomes the deficiencies of prior art plant containers of the type which comprises a pot and a tray.

Another object of the invention is to provide improved means for releasably connecting the pot and tray of a plant container.

Still another object of the invention is to provide an improved pot-and-tray plant container suitable for manufacture by molding resilient material.

Yet another object of the present invention is to provide an improved pot-and-tray plant container having improved means for interconnecting the pot and tray which is both simple and convenient to operate.

Other objects, aspects and advantages of the invention will be evident from the following detailed description when read in conjunction with the accompanying drawings in which.

Figure 1:
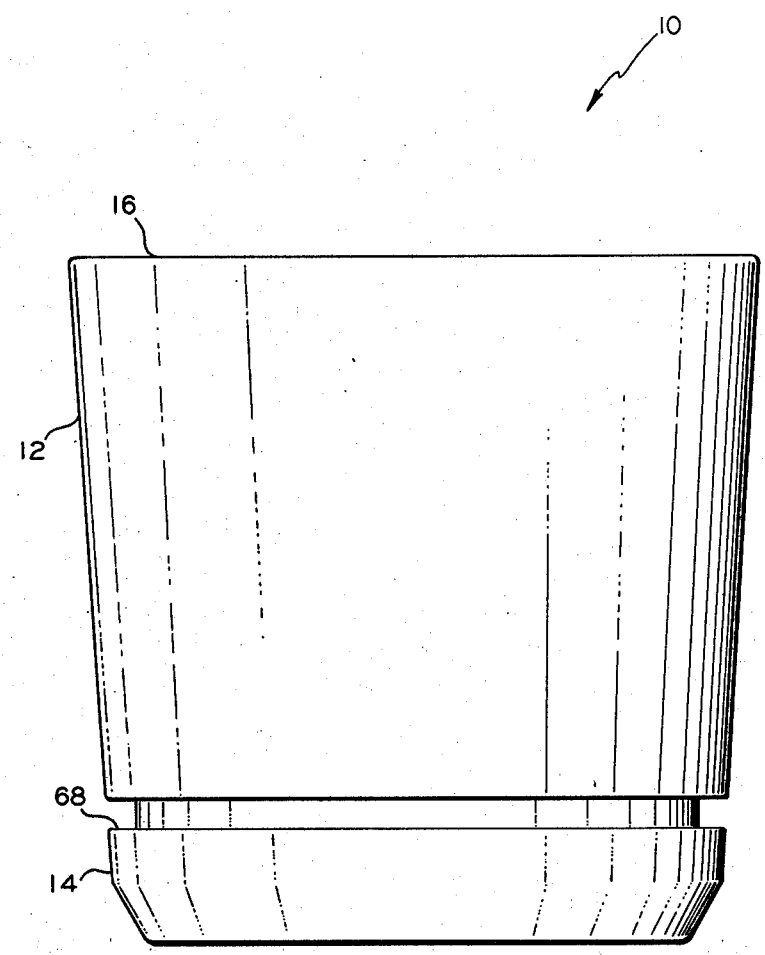
FIG. 1 is a side elevation of a pot-and-tray plant container constructed in accordance with the present invention.

Referring now to the drawings, a plant container constructed in accordance with the present invention is illustrated therein and is generally designated by the reference character 10. The plant container 10 comprises a pot 12 and a tray 14. The pot has an open upper end portion 16 and a substantially closed lower end portion 18. The lower end portion 18 is characterized by a generally flat, horizontally extending bottom portion 20 bordered by a downwardly extending annular rib 22 defining the outer margin of the bottom portion. An upwardly and outwardly flared continuous sidewall portion 24 extends upwardly from the outer margin of the bottom portion 20 and communicates with a generally cylindrically shaped, upwardly extending sidewall portion 26 which, in turn, communicates with a substantially horizontal, radially outwardly extending annular wall portion 28 which, in turn, communicates with a frustoconically shaped sidewall portion 30 which extends upwardly and outwardly therefrom, terminating in the previously mentioned open upper end portion 16. The generally flat bottom portion 20 is provided with four pairs of apertures 32 with each pair of apertures 32 separated by a horizontal locking bar 34 which extends horizontally radially outwardly from the center of the bottom portion 20 of the pot 12. Each horizontal locking bar 34 is characterized by a generally triangular vertical cross section with a substantially horizontal upper surface 36, preferably coplanar with the upper surface of the horizontal bottom portion 20, and with downwardly extending and converging side surfaces 38 and 40. Each pair of apertures 32 is equally spaced from each adjacent pair of apertures along a horizontal circular path on the bottom portion 20 of the pot 12. The pairs of apertures 32 provide paths for water to pass through between the interior of the pot 12 and the exterior of the lower end portion 18.

The tray 14 is provided with a generally flat, substantially horizontal bottom portion 42. Concentric annular ribs 44 and 46 extend upwardly from the bottom portion 42 and are each interrupted at four equally spaced positions as shown respectively at 48 and 50. The interruptions 48 and 50 provide water flow channels through each of the annular ribs 44 and 46 along the bottom portion 42 of the tray 14.

Figure 2:
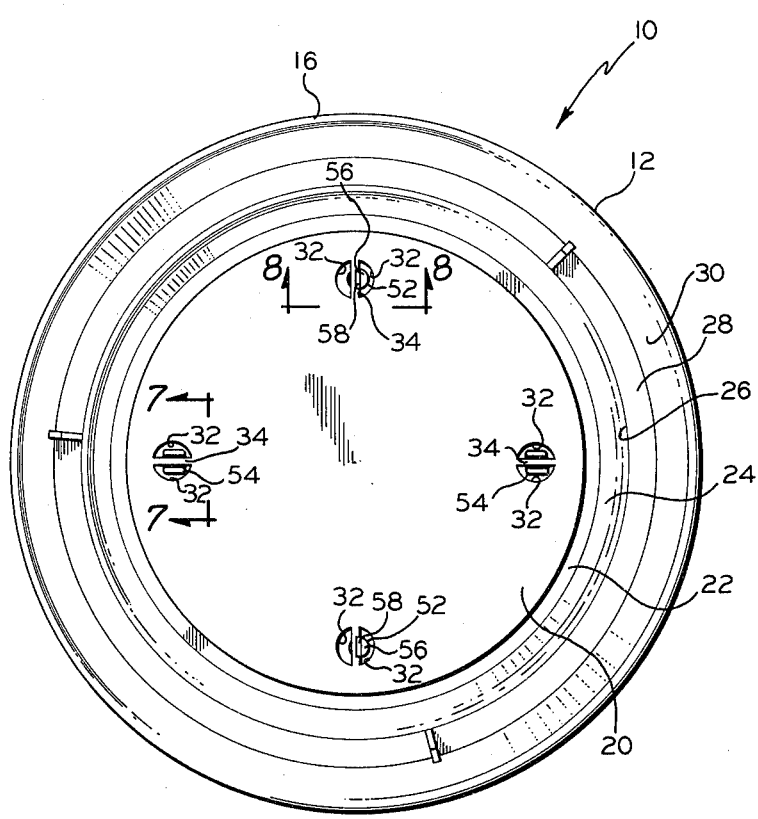
FIG. 2 is a top plan of the plant container of FIG. 1.
Figure 3:
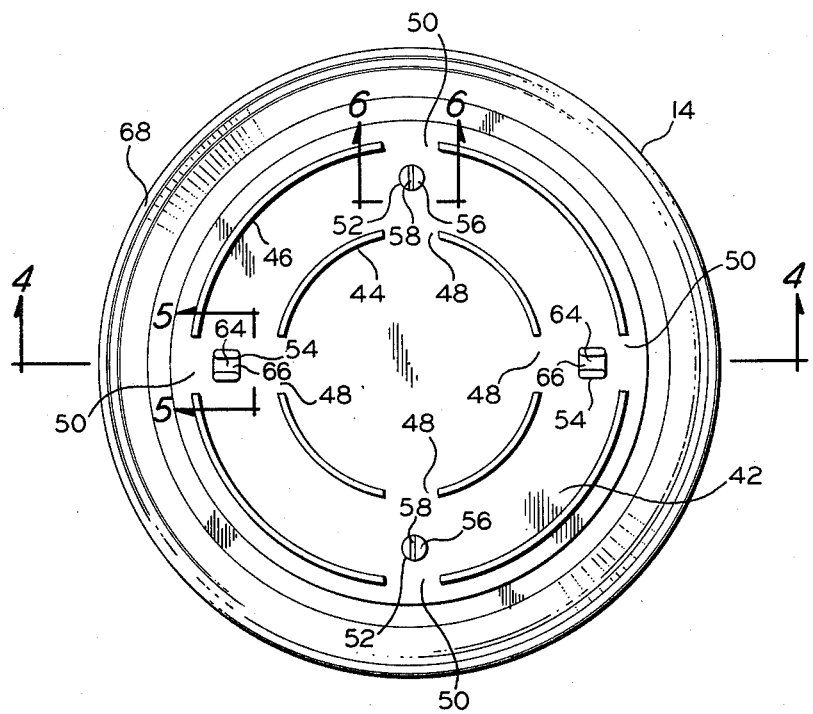
FIG. 3 is a top plan of the tray of the plant container of FIG. 1.
Figure 4:
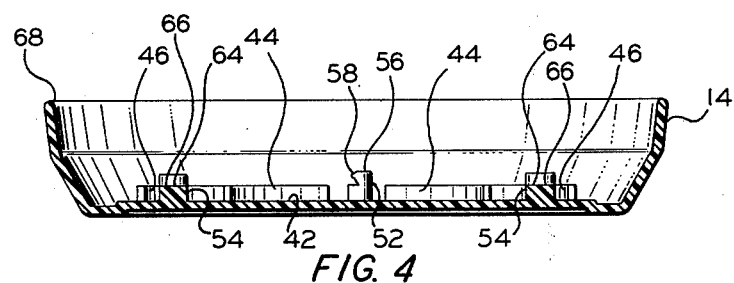
FIG. 4 is a cross section taken along line 4—4 of FIG. 3.

The tray 14 is further provided with a pair of upwardly extending first protuberances 52 and a pair of upwardly extending second protuberances 54 extending upwardly from the bottom portion 42 of the tray 14. The protuberances 52 and 54 are alternately equally spaced one from the other along a horizontal circular path on the bottom portion 42 of the tray 14 which is equal in diameter to the horizontal circular path along which the pairs of apertures 32 are spaced on the bottom portion 20 of the pot and are thus positioned in substantial registration with corresponding pairs of apertures 32 of the pot 12 when the pot 12 and tray 14 are positioned relative to each other as illustrated in FIGS. 1 and 2.

Figure 6:
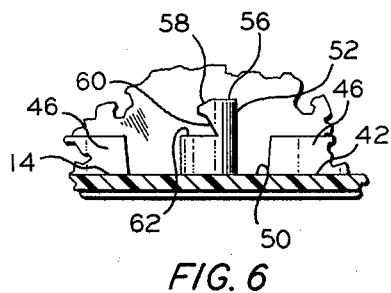
FIG. 6 is an enlarged partial cross section taken along line 6—6 of FIG. 3.
Figure 8:
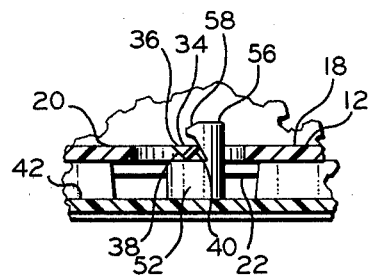
FIG. 8 is an enlarged partial cross section taken along line 8—8 of FIG. 2.

Each first protuberance 52 is preferably substantially cylindrically shaped and includes a top surface 56 which includes a downwardly and outwardly extending cam surface 58 as best illustrated in FIG. 6. A generally horizontally extending notch 60 is formed in one side of each of the first protuberances 52 and is sized and shaped to receive a corresponding horizontal locking bar 34 of the pot 12 therein, as best shown in FIG. 8, when the pot 12 and tray 14 are assembled as illustrated in FIGS. 1 and 2. The cam surface 58 is so configured as to engage the side surface 38 of the corresponding horizontal locking bar 34 and deflect the horizontal locking bar 34 by means of camming action between the cam surface 58 and the side surface 38, acting as a cam follower, as the pot 12 is moved into engagement with the tray 14. The lower surface 62 of each notch 60 and the upper surfaces of the interrupted annular ribs 44 and 46 preferably lie in a common horizontal plane so as to facilitate support of the lower end portion 18 of the pot 12. Due to the inherent resilience of the horizontal locking bars 34, when the horizontal locking bars 34 are moved downwardly beyond the corresponding cam surfaces 58, the horizontal locking bars 34 return to their normal relaxed condition and are thereby received within the corresponding horizontal notches 60 as best shown in FIG. 8 thus releasably securing the pot 12 to the tray 14. The notches 60 of the diametrically opposed first protuberances preferably open in the same direction relative to the tray 14.

Figure 5:
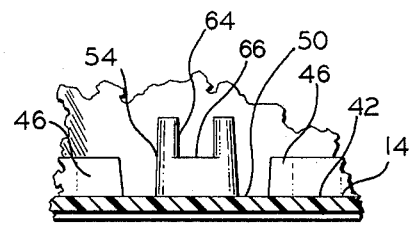
FIG. 5 is an enlarged partial cross section taken along line 5—5 of FIG. 3.
Figure 7:
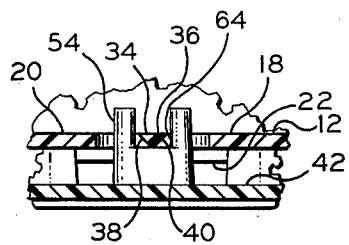
FIG. 7 is an enlarged partial cross section taken along line 7—7 of FIG. 2.

Each second protuberance 54 extends upwardly from the bottom portion 42 of the tray 14 and is provided with a generally horizontally extending, upwardly opening notch 64 formed in the top portion thereof, as best shown in FIGS. 5 and 7. The lower surface 66 of each notch 64 preferably lies in a common horizontal plane with the lower surfaces 62 of the notches 60 and the upper surfaces of the interrupted annular ribs 44 and 46. The notch 64 is sized and shaped to receive a corresponding horizontal locking bar 34 of the pot 12 therein to resist relative rotation between the pot 12 and the tray 14 and maintain locking engagement between the horizontal locking bars 34 and the notches 60 of the first protuberances 52.

The pot 12 and tray 14 of the plant container 10 are releasably securable together by positioning the pot 12 with the closed lower end portion 18 thereof within the open upper end portion 68 of the tray 14 and with the pairs of apertures 32 and their corresponding horizontal locking bars 34 of the pot 12 in registration with the corresponding protuberances 52 and 54 of the tray 14. It should again be noted that the horizontal locking bars 34 on the pot and the notches 60 formed in the first protuberances 52 on the tray are sized and shaped to provide a close snap fit therebetween when the pot 12 and tray 14 are assembled together by forcing the mutually registered pot 12 and tray 14 together. Such snap fit is best illustrated in FIGS. 2 and 8. It will again be further noted that each of the second protuberances 54 receives a corresponding horizontal locking bar 34 in the upwardly opening notch 64 thereof to provide means for restricting rotational movement between the pot 12 and the tray 14 thus maintaining the snap fit between the horizontal locking bars 34 and the notches 60 of the first protuberances 52.

To disassemble the interconnected pot 12 and tray 14, it is merely necessary to apply firm, but not excessive, separating and relative rotational force between the pot 12 and tray 14 to disengage the resilient interconnections provided by the horizontal locking bars 34 and notches 60 and 64.

It will be noted that the upwardly extending interrupted annular ribs 44 and 46 preferably extend above the bottom portion 42 of the tray 14 a distance appreciably greater than the distance extended below the generally flat bottom portion 20 of the pot 12 by the downwardly extending annular rib 22, as shown in FIGS. 7 and 8. This height differential between the interrupted annular ribs 44 and 46 of the tray 14 and the annular rib 22 of the pot 12 provide a suitable clearance between the annular rib 22 of the pot and the generally flat bottom portion 42 of the tray to permit unrestricted water flow through the tray 14 under the pot 12.

While any suitable materials can be employed for the construction of the pot 12 and tray 14 of the plant container 10, it is presently preferred that a relatively rigid material having a moderate degree of resilience be employed in the construction of the pot 12 and tray 14 to facilitate the snap-locking mechanism embodied in the invention for connecting the pot 12 and tray 14.

Suitable materials for use in this regard include moldable thermosetting and thermoplastic synthetic resinous materials. Injection moldable thermoplastic alpha-olefin polymer and copolymer materials are well adapted for the construction of the pot 12 and tray 14 with polypropylene and polyethylene being especially well adapted for such purpose.

The locking action provided by the first protuberances 52 and the corresponding horizontal locking bars 34 as well as the antirotational securement provided by the protuberances 54 and the apertures 32 and horizontal locking bars 34 provides a snap-locking mechanism between the pot and tray 14 of the plant container 10 which remains securely in place even during relatively rough handling of the interconnected pot and tray, but which can be readily disconnected by the application of only moderate force when it is desired to separate the pot and tray for cleaning purposes or other reasons.

It should be understood that the structure illustrated and described herein evidences only one embodiment of the present invention. It will be readily apparent that more or less interruptions may be employed in the upstanding annular ribs of the tray 14 as well as more or less protuberances 52 and 54, and corresponding additional pairs of apertures 32 and horizontal locking bars 34 can be provided in the pot 12. Similarly, it will be understood that other configurations of plant containers can employ the pot-to-tray connecting mechanism of the instant invention, such as square, rectangular, triangular or polygonal shapes. Furthermore, the annular ribs 22, 44 and 46 need not be circular as illustrated herein, but may rather be configured in any desired shape as long as the pot and tray can be placed in registration one with the other with the various locking elements thereof in corresponding registration.

Changes can be made in the combination and arrangement of parts or elements as heretofore set forth in the specification and shown in the drawings without departing from the spirit and scope of the invention as defined in the following claims.

That which is claimed is:

1. A container for plants or the like, comprising:
   a tray having a generally flat horizontal bottom portion with an outer margin, at least one rib upstanding from the bottom portion and a continuous wall upstanding from the outer margin of the bottom portion; a plurality of first protuberances extending upwardly from the bottom portion of said tray, each first protuberance having a generally horizontally extending notch in one side of the first protuberance; a plurality of second protuberances extending upwardly from the bottom portion of said tray, each second protuberance having a generally horizontally extending upwardly opening notch in the top portion of the second protuberance; and
   a pot having a generally flat horizontal bottom portion with an outer margin and a continuous wall upstanding from the outer margin; a plurality of pairs of apertures extending through the bottom portion of said pot, a pair of apertures being positioned in vertical registration with each one of the first and second protuberances of said tray, and each pair of apertures being separated by horizontal locking bar means sized and shaped to be optionally received in the notch of a corresponding first or second protuberances in vertical registration therewith for releasably securing said tray to said pot.

2. A container in accordance with claim 1 wherein:
   said tray includes two first protuberances and two second protuberances alternately equally spaced one from the other along a first horizontal circular path on the bottom of said tray; and
   said pot includes four of said pairs of apertures each separated by horizontal locking bar means equally spaced from each adjacent one of said pairs of apertures along a second horizontal circular path on the bottom of said pot.

3. A container in accordance with claim 2 wherein the horizontally extending notches of said first protuberances open in the same direction.

4. A container in accordance with claim 1 wherein said pot and said tray are each formed of a resilient, moldable, synthetic resinous material.

5. A container in accordance with claim 1 wherein each said horizontal locking bar means is further characterized as having a generally triangular vertical cross section with a substantially horizontal upper surface and downwardly extending and converging side surfaces.

6. A container in accordance with claim 1 wherein the at least one rib of said tray is interrupted at least one position along the length thereof so as to provide a water flow channel through the at least one rib along the bottom portion of said tray.

7. A container in accordance with claim 1 wherein the at least one rib of said tray is characterized further as being concentric first and second annular ribs, each said annular rib being interrupted at at least one position along the length thereof so as to provide a waterflow channel through each said annular rib along the bottom portion of said tray.

8. A container in accordance with claim 1 wherein:
   each said first protuberance includes a top surface, each said top surface including cam surface means formed thereon and extending downwardly and outwardly toward the generally horizontally extending notch in said first protuberance;
   each horizontal locking bar means including a generally downwardly facing cam follower means formed thereon; and
   said cam follower means being adapted to engage said corresponding cam surface means in vertical registration therewith as said tray and said pot are moved relatively together for deflecting said horizontal locking bar means around the upper portion of the first protuberance in registration therewith and into releasable locking engagement in the corresponding horizontally extending notch thereof.

9. A container in accordance with claim 1 or claim 8 wherein the lower surfaces of the notches of said first and second protuberances and the upper surface of the at least one rib of said tray lie in a common horizontal plane.

10. A container in accordance with claim 9 wherein:
    said tray includes two first protuberances and two second protuberances alternately equally spac,d one from the other along a first horizontal circular path on the bottom of said tray; and
    said pot includes four of said pairs of apertures each separated by horizontal locking bar means equally spaced from each adjacent one of said pairs of apertures along a second horizontal circular path on the bottom of said pot.

11. A container in accordance with claim 10 wherein the at least one rib of said tray is characterized further as being concentric first and second annular ribs, each said annular rib being interrupted at at least one position along the length thereof so as to provide a water flow channel through each said annular rib along the bottom portion of said tray.

12. A container in accordance with claim 10 wherein the at least one rib of said tray is interrupted at at least one position along the length thereof so as to provide a water flow channel through the at least one rib along the bottom portion of said tray.

13. A container in accordance with claim 12 wherein said pot and said tray are each formed of a resilient, moldable, synthetic resinous material.

14. A container in accordance with claim 13 wherein each said horizontal locking bar means is further characterized as having a generally triangular vertical cross section with a substantially horizontal upper surface and downwardly extending and converging side surfaces.

15. A container in accordance with claim 14 wherein the horizontally extending notches of said first protuberances open in the same direction.

* * * * *